United States Patent [19]

Hurtubise

[11] Patent Number: 4,524,936
[45] Date of Patent: Jun. 25, 1985

[54] PIPE HANGER

[76] Inventor: Gerard Hurtubise, 851 Rochon, Ste-Thérèse-en-haut, Quebec, Canada, G7E 4B2

[21] Appl. No.: 644,441

[22] Filed: Aug. 27, 1984

Related U.S. Application Data

[63] Continuation of Ser. No. 472,770, Mar. 7, 1983, which is a continuation-in-part of Ser. No. 291,953, Aug. 11, 1981, abandoned.

[51] Int. Cl.³ ............................................. F16L 3/00
[52] U.S. Cl. .................................... 248/62; 248/68.1
[58] Field of Search ................... 248/58, 59, 62, 68.1, 248/218.4, 219.1, 230, 295.1, 297.5, 296

[56] References Cited

U.S. PATENT DOCUMENTS

| | | | |
|---|---|---|---|
| 943,910 | 12/1909 | Breedlove | 248/296 |
| 994,449 | 6/1911 | Festa | 248/230 |
| 1,505,220 | 8/1924 | Shay | 248/296 X |
| 1,805,006 | 5/1931 | Neilon | 248/62 |
| 2,616,645 | 11/1952 | Kindorf et al. | 248/62 |
| 2,918,202 | 12/1959 | Constantine et al. | 248/230 X |
| 2,961,479 | 11/1960 | Bertling | 174/43 |
| 3,108,828 | 10/1963 | Kus . | |
| 3,180,598 | 4/1965 | Girard | 248/68.1 |
| 3,245,643 | 4/1966 | Morrow | 248/68.1 |
| 3,261,580 | 7/1966 | Schauster | 248/62 |
| 3,295,812 | 1/1967 | Schneider | 248/230 X |
| 3,377,038 | 4/1968 | Loudon | 248/62 X |
| 3,385,545 | 5/1968 | Patton | 248/68.1 |
| 3,682,422 | 8/1972 | Evans | 248/68.1 |
| 3,866,871 | 2/1975 | Dupuy | 248/59 |
| 3,884,438 | 5/1975 | Logsdon | 248/59 |
| 4,042,198 | 8/1980 | Takeuchi | 248/62 |
| 4,245,806 | 1/1981 | Vangreen | 248/49 |
| 4,338,875 | 7/1982 | Lisowski | 248/230 X |

Primary Examiner—William H. Schultz
Attorney, Agent, or Firm—Swabey, Mitchell, Houle, Marcoux & Sher

[57] ABSTRACT

This invention is directed toward a unitary, preformed bracket for use in a pipe hanger. The bracket has top and bottom sections joined by a pipe receiving section lying to one side of the top and bottom sections. The top and bottom sections have mounting openings for use in mounting the bracket on a threaded support rod. The pipe receiving section has means for retaining a pipe therein against movement in a direction transverse to the pipe axis. The invention is also directed toward a pipe hanger incorporating the bracket, the hanger including means to securely fix the bracket to the threaded rod.

6 Claims, 15 Drawing Figures

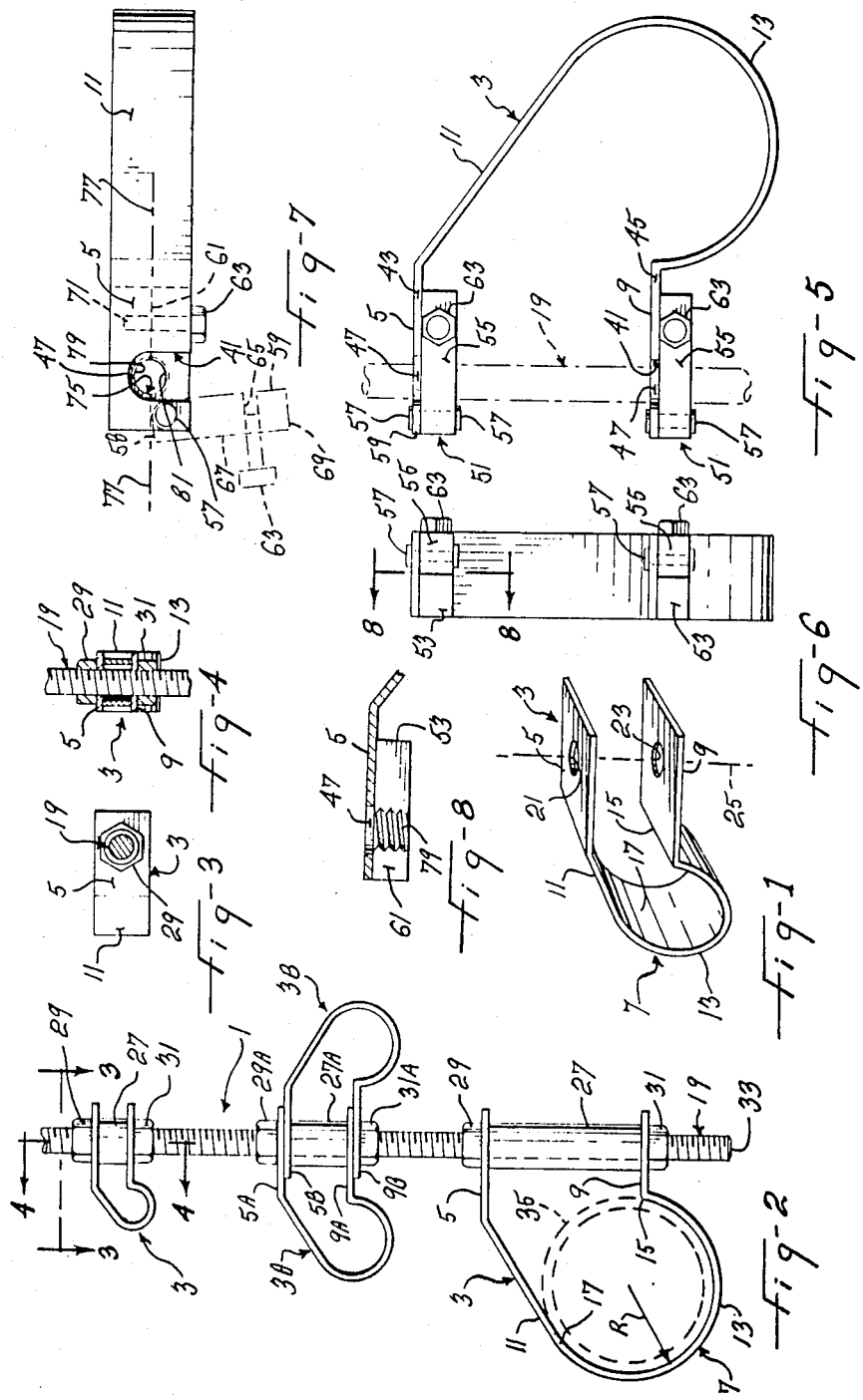

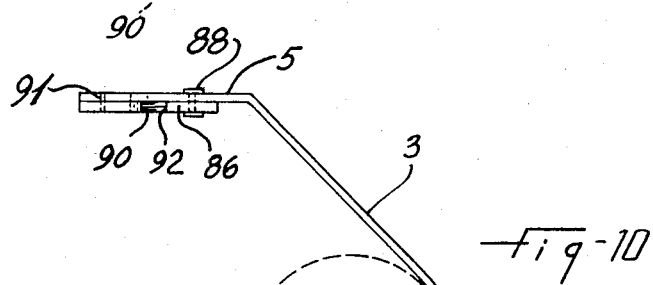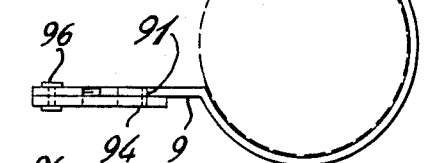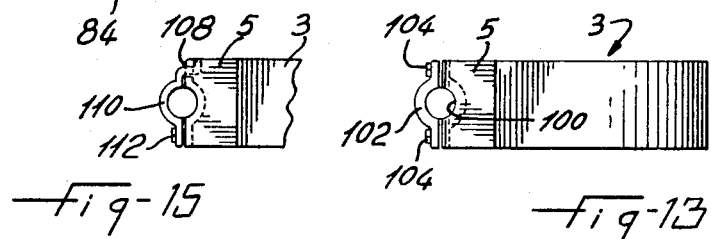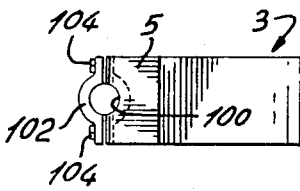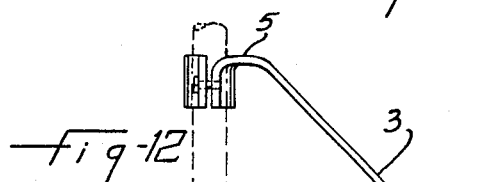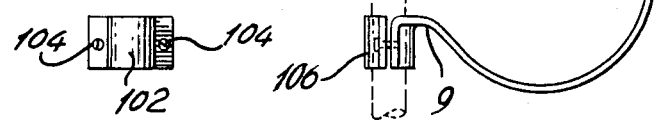

PIPE HANGER

CROSS-REFERENCE TO RELATED APPLICATIONS

This application is a continuation of Ser. No. 472,770, 3-7-83, which is a continuation-in-part of U.S. application Ser. No. 291,953, filed Aug. 11, 1981 abandoned.

BACKGROUND OF THE INVENTION

1. Field of the Invention

This invention is directed toward an improved bracket for use in a pipe hanger.

The invention is further directed toward an improved pipe hanger employing the improved bracket.

2. Description of the Prior Art

Pipe hangers, to hang or suspend pipes, or similar tubular members, in buildings or other structures are well known. All the known hangers however have various disadvantages. One style of pipe hanger employs a pair of support rods with the pipe or pipes fixed in brackets extending between the rods. The brackets can be vertically adjusted on the rods. The use of two support rods make such hangers relatively expensive however.

It is also known to use pipe hangers which employ a single support rod to make the hangers less expensive. The brackets for holding the pipe or pipes on the single support rod can also be vertically adjustable on the rod. Examples of such hangers are shown in U.S. Pat. Nos. 2,961,479 and 4,245,806. However, the use of a single support rod often makes it difficult to hang more than one pipe at one level. For example, using the brackets shown in U.S. Pat. No. 2,961,479, two pipes cannot be hung on the same level from the support rod because the brackets would interfere with each other.

Single support rod hangers also often do not securely hang the pipe. For instance, some hangers employ brackets which do not securely fix the pipe in all the loop ends of the bracket. Thus the pipe can move in the hanger bracket relative to the support rod. In addition, the brackets, or at least portions of the brackets, can move vertically on the support rod making the hung pipes even less secure.

Another disadvantage of known single support rod type hangers, particularly hangers employing threaded support rods, is that quite a bit of work is involved if an additional pipe is to be suspended from the rod between two vertically spaced-apart pipes which are already installed. The bracket for the lower pipe and/or a threaded member holding the bracket on the rod, must first be removed to allow the additional pipe bracket to be installed, and then be replaced.

SUMMARY OF THE INVENTION

It is therefore one purpose of the present invention to provide a pipe bracket for use in pipe hangers of the single support rod type which bracket firmly and securely supports a pipe.

It is another purpose of the present invention to provide a pipe hanger of the single support rod type which hanger firmly and securely supports one or more pipes.

It is yet another purpose of the present invention to provide a pipe hanger of the single support rod type on which one or more pipes can be supported at adjustable heights, and on which two pipes can be supported at approximately the same height.

It is a further purpose of the present invention to provide a pipe hanger of the single support rod type in which one or more hanger brackets, can be added to the support rod between already installed hanger brackets without having to remove any of the installed hanger brackets.

It is yet another purpose of the present invention to provide strong yet relatively simple pipe hangers of the single support rod type.

In accordance with the present invention, there is provided an improved pipe hanger of the single rod support type having one or more hanger brackets which brackets are preformed to securely hold pipes within the brackets. Each bracket is provided with a section which securely holds and locks a pipe in place preventing its movement within the bracket. In addition, the brackets are securely mounted to the support rod at two vertically spaced-apart locations so as to provide a rigid, secure support for the pipe.

The brackets are also shaped and mounted on the rod in a manner permitting two brackets of the same size to be mounted on the same location on the rod, the brackets extending in opposite directions from the rod to thereby support two pipes at approximately the same level. The same elements required to attach one bracket to the rod can be used to attach two brackets to the rod.

In another embodiment of the invention, the brackets can be provided with special attachment means permitting the brackets to be directly installed on a threaded support rod between already installed brackets without having to remove the installed brackets. The attachment means comprise clamps fixed to the ends of the brackets which clamps can be opened up to install the bracket laterally onto the rod and then closed to clamp tightly onto the threaded rod.

The invention is particularly directed toward a unitary, preformed bracket for use in a pipe hanger. The bracket has a straight top section, a straight bottom section, and a pipe receiving section joining the top and bottom sections. The top section overlies the bottom section and extends generally parallel to it, and the pipe receiving section lies to one side of the top and bottom sections and extends below the bottom section. A mounting opening is provided in both the top and bottom sections, the openings in both sections aligned on an axis which extends perpendicular to both sections. Means are provided in the pipe receiving station for retaining a pipe against movement in a direction transverse to the pipe axis.

The invention is further directed toward a pipe hanger having a threaded support rod and a unitary, preformed bracket. The bracket has a straight top section, a straight bottom section, and a pipe receiving section joining the top and bottom sections. The top section overlies the bottom section and extends generally parallel to it, and the pipe receiving station lies to one side of the top and bottom sections and extends below the bottom section. A mounting opening is provided in both the top and bottom sections, the openings in both sections aligned on an axis which extends perpendicular to both sections. Means are provided in the pipe receiving section for retaining a pipe against movement in a direction transverse to the pipe axis. Means are provided for securely holding both the top and bottom sections of the bracket on the support rod which rod is passed through the mounting openings.

In one embodiment, the means for holding the bracket sections on the rod comprise a separate spacing sleeve, mounted on the rod between the sections and a separate pair of nuts on the rod holding the sections against the sleeve.

In other embodiments, the means for holding the bracket sections on the rod can comprise a clamp mounted on each section.

BRIEF DESCRIPTION OF THE DRAWINGS

Having thus generally described the nature of the invention, reference will now be made to the accompanying drawings, showing by way of illustration, a preferred embodiment thereof, and in which:

FIG. 1 is a perspective view of a bracket;

FIG. 2 is an elevation view of a pipe hanger with different sizes of brackets thereon;

FIG. 3 is a cross-section view taken along line 3—3 of FIG. 2;

FIG. 4 is a cross-section view taken along line 4—4 of FIG. 2;

FIG. 5 is a front elevation view of another embodiment of the bracket with a locking element shown in an alternative position by means of phantom lines;

FIG. 6 is a side elevation view of the pipe hanger shown in FIG. 5;

FIG. 7 is a plan view of the pipe hanger shown in FIG. 5;

FIG. 8 is a cross-section view taken along line 8—8 of FIG. 6;

FIG. 9 is a top plan view of a bracket in accordance with another embodiment of the present invention;

FIG. 10 is a side elevation of the bracket shown in FIG. 9;

FIG. 11 is a fragmentary cross-section top plan view of an element of FIGS. 9 and 10;

FIG. 12 is a side elevation of the bracket including a different embodiment;

FIG. 13 is a top plan view FIG. 12;

FIG. 14 is an end elevation of one of the elements in FIG. 12; and

FIG. 15 shows another embodiment of the device shown in FIGS. 12 to 14.

DESCRIPTION OF THE PREFERRED EMBODIMENTS

The pipe hanger 1 of the present invention, as shown in FIGS. 1 to 4, has one or more unitary, preformed brackets 3. Each bracket 3 consists of a straight top section 5, a pipe receiving section 7 and a straight bottom section 9. The top and bottom sections 5, 9 are parallel to each other with the top section 5 overlying the bottom section 9. The pipe receiving section 7 is located to one side of the top and bottom sections 5, 9 and partly below the bottom section 9. The pipe receiving section includes a straight, downwardly angled side section 11 and a part-circular section 13. The top section 5 leads into the side section 11, which in turn leads down into the part-circular section 13, which in turn leads up into the bottom section 9. The inside radius R of the part-circular section 13 is equal to the outside radius of the pipe to be carried by the hanger. The part-circular section 13 is formed to extend over an arc substantially greater than 180° and substantially less than 270° so as to firmly hold a pipe while allowing the mouth of the section 13, extending between ends 15, 17 of the section, to be opened up to allow entry of the pipe into the section.

Means are provided on the bracket 3 for mounting it on a threaded, vertical support rod 19. The mounting means comprise openings in the form of a first mounting hole 21 in the top section 5 and a second mounting hole 23 in the bottom section 9. The mounting holes 21, 23 are aligned on a vertical axis 25 which extends perpendicular to the top and bottom sections 5, 9 and are slightly larger in size than the support rod 19.

Means are provided for securely attaching the bracket 3 to support rod 19, when the rod 19 is passed through holes 21, 23. The attaching means include a sleeve 27 having a length generally equal to the distance between the inner or facing surfaces of the top and bottom sections 5, 9. The sleeve 27 is sized to just fit over the rod 19 and preferably has a cylindrical shape. The attaching means further includes a pair of nuts 29, 31 which are sized to thread onto threaded rod 18.

To attach the bracket 3 to support rod 19, first nut 29 is threaded onto rod 19 from its bottom end 33. The bracket 3, with sleeve 27 located between sections 5, 9 and aligned with the mounting holes 21, 23, is then moved onto rod 19 against nut 29 with the rod passing through holes 21, 23 and sleeves 27. The top surface of top section 5 abuts nut 29. The second nut 31 is then threaded onto rod 19 from its bottom end 33 to abut against the bottom surface of bottom section 9 of bracket 3 to secure bracket 3 against linear movement on rod 19 between nuts 29, 31.

A pipe 35 carried by bracket 3 on hanger 1, passes through the space bounded by bracket 3 and rod 19 and fits snugly in the part-circular section 13 of bracket 1. The rigid bracket 3 securely holds the pipe 35 against movement transverse to the pipe axis and with the top and bottom sections 5, 9 securely fixed on rod 19, the bracket and thus pipe 35 cannot move linearly along the rod 19. The height of the bracket 3 can be adjusted along rod 19 by movement of nuts 29, 31 to properly locate the height of pipe 35. In addition, the bracket 3 can be rotated about rod 19 if needed to align it with a pipe.

The brackets 3 are made in various sizes depending on the diameter of the pipe to be hung, with the part-circular section sized to receive the desired size of pipe. The sleeves 27 have a length to suit the size of bracket as shown in FIG. 2.

If desired, two brackets 3a, 3b of the same size can be mounted in opposing relationship on the rod 19 using a single sleeve 27a and to nuts 29a, 31a as shown in FIG. 2. The top section 5a of bracket 3a overlies the top section 5b of bracket 3b and the bottom section 9a of bracket 3a overlies the bottom section 9b of bracket 3b. The holes on the top and bottom sections 5a, 9a of bracket 3a are aligned with the holes in the top and bottom sections 5b, 9b of bracket 3b. Sleeve 27a is mounted between the top section 5b of bracket 3b and the bottom section 9a of bracket 3a. The sleeve 27a preferably is of normal length generally equal to the distance between the top and bottom sections of either bracket 3a, 3b. It can however be shortened slightly by a distance equal to the thickness of a bracket. The use of the shortened sleeve, as shown in FIG. 2 permits the top and bottom sections of the brackets to remain parallel. The use of a normal length sleeve moves the sections apart only slightly and does not change the operation of the brackets. The opposed mounting of brackets 3a, 3b permits two pipes to be hung at approximately the same level by the hanger.

In another embodiment of the invention, shown in FIGS. 5 to 8, the means for mounting the bracket 3 on the rod 19 can comprise a slot 41 in each of the top and bottom sections 5, 9. The slots 41 extend transversely inwardly from the side edge 43, 45 of sections 5, 9 respectively. The slots 41 have a semi-circular bottom edge 47 and are sized to freely receive rod 19. The slots 41 extend inwardly a distance sufficient to locate the center of radius of edge 47 in the center of the sections 5, 9.

The means for attaching the bracket 3 shown in FIGS. 5 to 8 against linear movement along rod 19 comprises an attaching clamp 51 on each of the top and bottom sections 5, 9. Each clamp 51 is identical so only one will be described. Clamp 51 comprises a fist jaw member 53 fixed to the top section 5 and a second jaw member 55 movable with respect to the first jaw member 53 and to the top section 5. The second jaw member 55 is mounted by a vertical pivot pin 57 adjacent one end 58 to the top section 5. The second jaw member 55 moves about pivot pin 57 between a closed position, where one side 59 of second jaw member 55 abuts against one side 61 of the first jaw member 53, and an open position, where the second jaw member 55 extends generally at right angles to the first jaw member 53. Means are provided for retaining the jaw members 53, 55 in the closed position. These means can comprise a bolt 63 which threads into a threaded hole 65 passing through the second jaw member 55 from the other side 67 to the one side 59, adjacent the other end 69 of member 55. In the closed position, hole 65 is aligned with a short, threaded blind hole 71 extending into first jaw member 53 from its one side 61. In the closed position of the jaw members 53, 55, the bolt 63 is turned to enter hole 71 to securely lock the jaw members together.

A threaded hole 75 passes through each clamp 51, the hole 75 being bisected by the plane 77 along which the jaw members 53, 55 abut when the clamp 51 is closed. Thus one half 79 of hole 75 is in jaw member 53, the other half 81 of hole 75 is in jaw member 55. The center of hole 75 coincides with the center of radius of the bottom of the slot 41. Hole 75 is slightly smaller than slot 41 and is sized to snugly receive the threaded rod 19.

Bracket 3 is mounted on rod 19 by first opening both clamps 51 on the upper and lower sections 5, 9. The clamps 51 are opened by loosening bolts 63 and swinging jaw member 55 away from jaw member 53 about pivot pin 57. The second jaw member 55 is swung away a distance sufficient to clear the slot 41. The bracket 3 is then moved laterally to pass the threaded rod 19 into both slots 41 and in the hole half 79 on the fixed jaw members 53. The movable jaw members 55 are then closed onto the threaded rod and the clamps 51 are closed to lock the bracket 3 in position on the threaded rod 19. With this arrangement of slots and clamps, the bracket 3 can be installed directly onto a threaded support rod 19, between already installed brackets, without having to remove the brackets.

A further embodiment is illustrated in FIGS. 9 through 11. In this embodiment, the bracket 3 including the top and bottom sections 5 and 9 includes slots 82 and 84 respectively. The slot 82 opens to one side of the straight top section 5 at an angle in a direction away from the end of the section 5. Since the slot 82 is in the top section 5, the tension would be applied thereto by the weight of the pipe being carried by the bracket 3. A hook is formed by the slot 82. Flat plate 86 is pivotally mounted at 88 in parallel plane to the straight section 5 and includes a slot 90 extending in a direction towards the other side of the top section 5 when the plate is closed and at an angle away from the end thereof. When the bracket 3 is mounted to a support rod and the plate 86 is closed thereon both the plate 86 and the top section 5 are locked to the rod by virtue of the angled slots.

The plate 86 could also be provided with threads 92 if the hanging rod is threaded. Pin holes 91 are provided both in the top section 5 and the plate 86 to receive a locking pin if necessary.

The bottom section 9 has the slot 84 extending at an angle towards the end thereof and also has a hinged locking plate 94 pivoted at 96 on the side of the slot opposite the pivot point 88 on section 5. The locking plate 94 has a similar slot 98 extending towards the other side of the plate. The slots 84 and 98 extend in a direction opposite from the slots 82 and 90 since the bottom section is under compression forces against the support rod by virtue of the weight of the pipe being hung therein and the shape of the slots in both the bottom plate 9 and the locking plate 94 act as hooks securely locking the bracket 3 against the rod.

The embodiment shown in FIGS. 12 through 13 comprises a bracket 3. In this case the top section 5 and the bottom section 9 has a short extent and includes a split sleeve clamp of the type illustrated. In the embodiments shown in FIGS. 12 through 13, the split sleeve includes a semi-circular channel 100 formed in the upper section 5 with the axis of the channel being parallel to the axis of the rod 19. A clamp member 102 having a semi-circular channel located opposite the top member 5, is fastened thereto by means of bolts 104. It is not necessary that the rod 19 be threaded as the bolts 104 can be tightened to clamp the upper section 5 tightly onto the rod. A similar clamp 106 is provided in cooperation with the bottom section 9 and is tightly clamped onto the rod 19.

The embodiment shown in FIGS. 14 and 15 include a slot in one of the flanges on the top or bottom portions 5 or 9 receiving a hinge type bent flange 108 provided on the bracket 110. The bracket 110 can be tightened against the hinge part 108 by means of the bolts 112.

I claim:

1. A pipe hanger having a threaded support rod; a unitary, preformed bracket, the bracket consisting of a top section, a bottom section, and a pipe receiving section joining the top and bottom sections, the top section overlying the bottom section and extending parallel to it, the pipe receiving section lying to one side of the top and bottom sections and below the bottom section, the bottom section being straight and merging with the pipe receiving section, a support rod extending in a vertical axis at a right angle to the top and bottom sections, a mounting opening in the form of a slot in both the top and bottom sections, the slots in both sections aligned on the axis of the rod which extends perpendicular to both sections, the slots extending inwardly from side edges of the respective sections, a jaw pivotally mounted on each section and movable between a slot open position wherein the rod is free to be placed within the slots and a slot closed position wherein the jaw is closed against the rod to secure the bracket on the rod, and wherein the pipe pipe receiving and the bottom section retains a pipe against movement in a direction transverse to the pipe axis.

2. A unitary, preformed bracket for use in a pipe hanger consisting of a first section, a second section, and a pipe receiving section joining the first and second sections, the first section overlying the second section and extending parallel to it, the pipe receiving section extending to one side of the first and second sections and at least partially below the second section, the second section extending in a plane and terminating at the pipe receiving section, a support rod extending in an axis perpendicular to the first and second sections, a mounting opening in the form of a slot in both the first and second sections, the respective slots in each sections aligned on said axis which extends perpendicular to both sections and the slots extending inwardly from side edges of the respective sections, a jaw member mounted on each section and adapted to move between a slot open position and a slot closed position, the pipe receiving section and the second section abutting against a pipe to restrain the pipe against movement in a direction transverse to the pipe axis.

3. A pipe hanger as claimed in claims 1 or 2, wherein a second jaw fixed to each of the sections and said jaw is movable between closed and open positions relative to the second jaw, said jaw and second jaw securely clamping a threaded rod between them in a closed position.

4. A pipe hanger as claimed in claim 3 wherein each jaw has half of a threaded hole in the side facing the other jaw, the two halves forming a complete threaded hole through which the rod passes when the jaws are in a closed position.

5. A pipe hanger as claimed in claim 4 including means for releasably holding the jaws in closed position.

6. A pipe hanger as defined in claim 2, wherein the first section includes said slot for receiving the support rod, said slot opening to one side of the top section and having an axis at an angle extending towards the pipe receiving section and said jaw being in the form of a locking plate pivotally mounted in a plane parallel to to the top section and having a slot opening in the direction opposite to the first slot but at an angle extending towards the pipe receiving section; the pivoting locking plate in the top section being such construction that when they are closed together an aperature is formed by the bight of each slot approximately the size of the support rod; the bottom section including a pivoting plate and a pair of slots, one in the plate and one in the bottom section, the slots being angled away from the pipe receiving section, the locking plate and the bottom section cooperating such that when the locking plate is closed, it forms an aperature corresponding to the support rod.

* * * * *